(12) United States Patent
Sato et al.

(10) Patent No.: US 11,009,076 B2
(45) Date of Patent: May 18, 2021

(54) ROTARY SEAL

(71) Applicant: NAKANISHI METAL WORKS CO., LTD., Osaka (JP)

(72) Inventors: Takahiko Sato, Osaka (JP); Shinichi Akashi, Osaka (JP); Yusuke Iizawa, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 83 days.

(21) Appl. No.: 16/671,952

(22) Filed: Nov. 1, 2019

(65) Prior Publication Data

US 2020/0149589 A1    May 14, 2020

(30) Foreign Application Priority Data

Nov. 13, 2018  (JP) .............................. JP2018-212941

(51) Int. Cl.
*F16C 33/78*     (2006.01)
*F16J 15/3232*   (2016.01)
*F16J 15/3264*   (2016.01)

(52) U.S. Cl.
CPC ....... *F16C 33/7823* (2013.01); *F16J 15/3264* (2013.01); *F16C 33/7876* (2013.01); *F16C 33/7883* (2013.01); *F16J 15/3232* (2013.01)

(58) Field of Classification Search
CPC ............. F16C 33/7823; F16C 33/7876; F16C 33/7883; F16J 15/3232; F16J 15/3264
See application file for complete search history.

(56) References Cited

U.S. PATENT DOCUMENTS

| | | | | |
|---|---|---|---|---|
| 3,822,890 A | * | 7/1974 | Bourgeois | ............ F16J 15/3456 |
| | | | | 277/348 |
| 7,021,830 B2 | * | 4/2006 | Takehara | ............ F16C 33/7823 |
| | | | | 384/486 |
| 9,534,636 B2 | * | 1/2017 | Takayama | ............. F16C 33/805 |
| 2005/0089254 A1 | * | 4/2005 | Takehara | ................ B60B 37/00 |
| | | | | 384/484 |
| 2007/0201782 A1 | * | 8/2007 | Miyagawa | .......... B60B 27/0094 |
| | | | | 384/486 |
| 2015/0117805 A1 | * | 4/2015 | Takayama | ........... F16C 33/7883 |
| | | | | 384/446 |

FOREIGN PATENT DOCUMENTS

| | | |
|---|---|---|
| JP | H0462966 U | 5/1992 |
| JP | 2004011732 A | 1/2004 |
| JP | 2005016603 A | 1/2005 |

* cited by examiner

*Primary Examiner* — Nicholas L Foster
(74) *Attorney, Agent, or Firm* — Innovation Capital Law Group, LLP; Vic Lin

(57) ABSTRACT

A side lip has an intermediate thick portion. An inner circumferential side surface of the side lip has a side surface shape of a cone. An outer circumferential side surface of the side lip includes a first outer circumferential portion having a side surface shape of a cone in which the thickness gradually increases from a small diameter side toward a large diameter side, and a second outer circumferential portion having a side surface shape of a cone or a column in which the thickness gradually decreases. A thickness T1 of a distal end portion of the side lip is 0.5 T to 0.7 T, and a thickness T2 of the intermediate thick portion is 1.2 T to 1.5 T, relative to a thickness T of a base end portion of the side lip. An angle A of the distal end portion of the side lip is 10° to 30°.

2 Claims, 9 Drawing Sheets

ROTARY SEAL

BACKGROUND OF THE INVENTION

Field of the Invention

The present invention relates to a rotary seal that is a contact seal for sealing a rotating portion.

Description of the Background Art

Examples of a rotary seal that is a contact seal for sealing a rotating portion include a combination-type rotary seal used in, for example, a bearing device for supporting a wheel of an automobile (see, for example, Patent Literature 1 to 3).

Such a rotary seal having a side lip (axial lip) that protrudes in a diameter-increasing manner from a base portion of the side lip and is obliquely in slidable contact with a circumferential surface in the radial direction side of an outward flange of the slinger mounted to an inner member, for keeping the elasticity and tolerating the close contact and wear.

In some of such side lips, an outer circumferential side portion thereof is formed in such a swelling shape (hereinafter, referred to as "intermediate thick shape") that a lip halfway portion has an increased thickness (see, for example, FIG. 1 in Patent Literature 1, FIG. 5 and FIG. 7 in Patent Literature 2, and FIG. 1 to FIG. 4 in Patent Literature 3).

For example, in the rotary seal (FIG. 1) in Patent Literature 1, a thick part (swelling portion 31) of an outer circumferential portion, which is formed by the intermediate thick shape of a side lip 3, receives and blocks stress that causes radial expansion toward the radially outer side by an interference, and transfers the stress to a lip base portion.

Thus, the rotary seal in Patent Literature 1 does not allow change in the shape of the side lip 3 itself, and the lip angle is changed with respect to the lip base portion serving as a fulcrum. Therefore, even when wear of a contact portion located at an outer distal end progresses, the lip angle does not exhibit great angle change and the sealing force is not changed, so that this seal allegedly has excellent durability.

CITATION LIST

Patent Literature

[PTL 1] Japanese Unexamined Utility Model Application Publication No. H04-62966
[PTL 2] Japanese Unexamined Patent Application Publication No. 2004-11732
[PTL 3] Japanese Unexamined Patent Application Publication No. 2005-16603

SUMMARY OF THE INVENTION

However, for the side lip 3 of the rotary seal (FIG. 1) in Patent Literature 1, no consideration is given to change in the contact surface pressure when wear of the contact portion progresses.

The sealing property of the lip seal depends on the surface pressure. Therefore, it is necessary to keep the surface pressure equal to or greater than a limit surface pressure that can ensure the sealing property even when the contact portion is worn.

Side lips 2a, 2c of rotary seals (FIG. 5, FIG. 7) in Patent Literature 2 have the intermediate thick shape, but their shapes are a conventional shape indicated by a broken line in Graph 1 showing the relationship between a contact load (tightening force) and an interference. The tightening force greatly varies in accordance with change in the interference.

Side lips 22b, 22c of rotary seals (FIG. 1 to FIG. 4) in Patent Literature 3 are formed in the intermediate thick shape, so that a thickness t1 of a maximum thickness portion 37 is equal to or greater than twice a thickness t2 of a minimum thickness portion 36 of a base end portion ([0034]). With this configuration, change in the contact load (tightening force) is suppressed irrespective of change in the interference ([0031]).

However, the thicknesses of the side lips 22b, 22c in Patent Literature 3 are excessively great, and as wear of the contact portion of a distal end of each side lip 22b, 22c progresses, the amount of change in the contact area increases. If the contact area of the lip distal end portion increases due to wear, the surface pressure is reduced. This may prevent the sealing property from being ensured.

In view of the above circumstances, an object to be achieved by the present invention is to provide a rotary seal in which a side lip is formed in an intermediate thick shape without excessively increasing the thickness of the side lip, and in which, when wear of a distal end of the side lip progresses, the surface pressure is not reduced and therefore the sealing property is not reduced.

To achieve the above object, a rotary seal according to the present invention includes:

a core metal including a core metal cylinder having a cylindrical shape, and a core metal flange extending inward in a radial direction from one end of the core metal cylinder in an axial direction; and a seal member including a base portion joined to the core metal, and a seal lip portion, in which the seal lip portion includes a side lip protruding in a diameter increasing manner from the base portion, the side lip has an inner circumferential side surface and an outer circumferential side surface, and shapes of the inner circumferential side surface and the outer circumferential side surface that determine a thickness of the side lip are formed such that the inner circumferential side surface has a side surface shape of a cone, and the outer circumferential side surface includes a first outer circumferential portion having a side surface shape of a cone in which the thickness gradually increases from a small diameter side toward a large diameter side, and a second outer circumferential portion having a side surface shape of a cone or a column in which the thickness gradually decreases, so as to form an intermediate thick shape in which an intermediate thick portion at a boundary between the first outer circumferential portion and the second outer circumferential portion is thickest, a thickness of a distal end portion of the side lip is 0.5 T to 0.7 T, and a thickness of the intermediate thick portion is 1.2 T to 1.5 T, relative to a thickness T of a base end portion of the side lip, and an angle formed by a generating line of the cone of the inner circumferential side surface and a generating line of the cone or the column of the second outer circumferential portion is 10° to 30°.

Here, more preferably, the angle formed by the generating line of the cone of the inner circumferential side surface and the generating line of the cone or the column of the second outer circumferential portion is 15° to 25°.

In the rotary seal according to the present invention, the side lip is formed in the intermediate thick shape. The thickness of the distal end portion of the side lip is 0.5 T to 0.7 T, and the thickness of the intermediate thick portion is 1.2 T to 1.5 T, relative to the thickness T of the base end portion of the side lip. The angle of the distal end portion of the side lip is 10° to 30°, and preferably 15° to 25°.

Thus, while the side lip is formed in the intermediate thick shape, the thickness of the side lip is not excessively increased, and even when wear of the distal end of the side lip progresses, the initially set surface pressure is not greatly reduced, and the sealing property is not reduced.

DESCRIPTION OF THE PREFERRED EMBODIMENTS

Hereinafter, an embodiment of the present invention is described in detail with reference to the accompanying drawings.

As used herein, the direction of the rotation axis of the bearing device in a state where a rotary seal is mounted to a bearing device for supporting a wheel of an automobile is referred to as "axial direction", and a direction perpendicular to the axial direction is referred to as "radial direction".

In addition, a direction from a vehicle body of the automobile toward the wheel side is defined as "outboard", and the direction opposite thereto is defined as "inboard".

<Structure Example of Bearing Device Using Rotary Seal>

Figure 1:
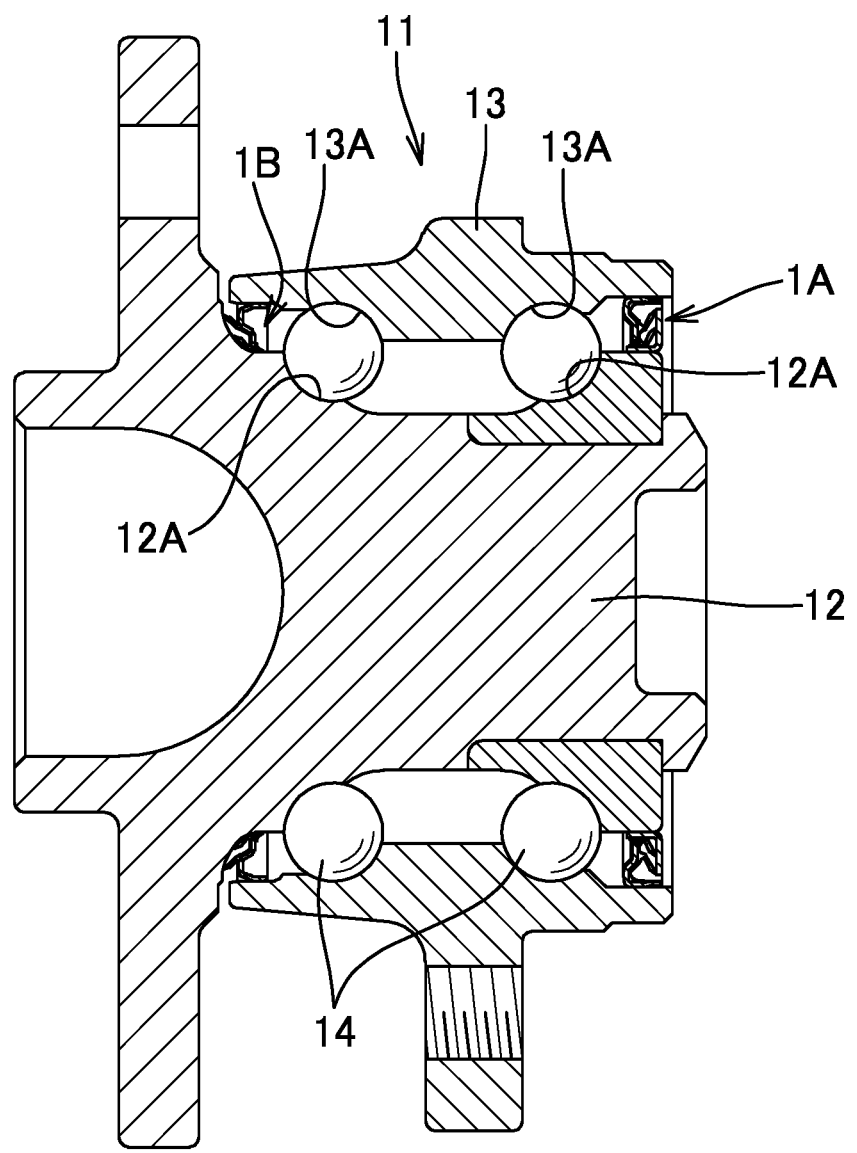
FIG. 1 is a partial vertical sectional view schematically showing an example in which a rotary seal according to an embodiment of the present invention is used in a bearing device for supporting a wheel of an automobile.

FIG. 1 is a vertical sectional view schematically and partially shows an example in which rotary seals 1A, 1B according to the embodiment of the present invention are used in a bearing device 11 for supporting a wheel of an automobile.

The bearing device 11 includes a bearing including: an inner ring 12 which has, on an outer circumferential surface thereof, an inner ring raceway surface 12A, and rotates together with the wheel; an outer ring 13 which has, on an inner circumferential surface thereof, an outer ring raceway surface 13A, and is integrated with the vehicle body; balls 14 which are rolling elements that roll between the inner ring raceway surface 12A and the outer ring raceway surface 13A; and so on.

Further, the bearing device 11 includes the rotary seals 1A, 1B which are respectively provided at the inboard-side end and the outboard-side end (on the inboard side with respect to the inboard-side balls 14 and on the outboard side with respect to the outboard-side balls 14) between the inner ring 12 and the outer ring 13, and which prevent entry of muddy water or the like and prevent leakage of lubricating grease.

<Structure Example of Rotary Seal>

(Rotary Seal on Inboard Side)

Figure 2:
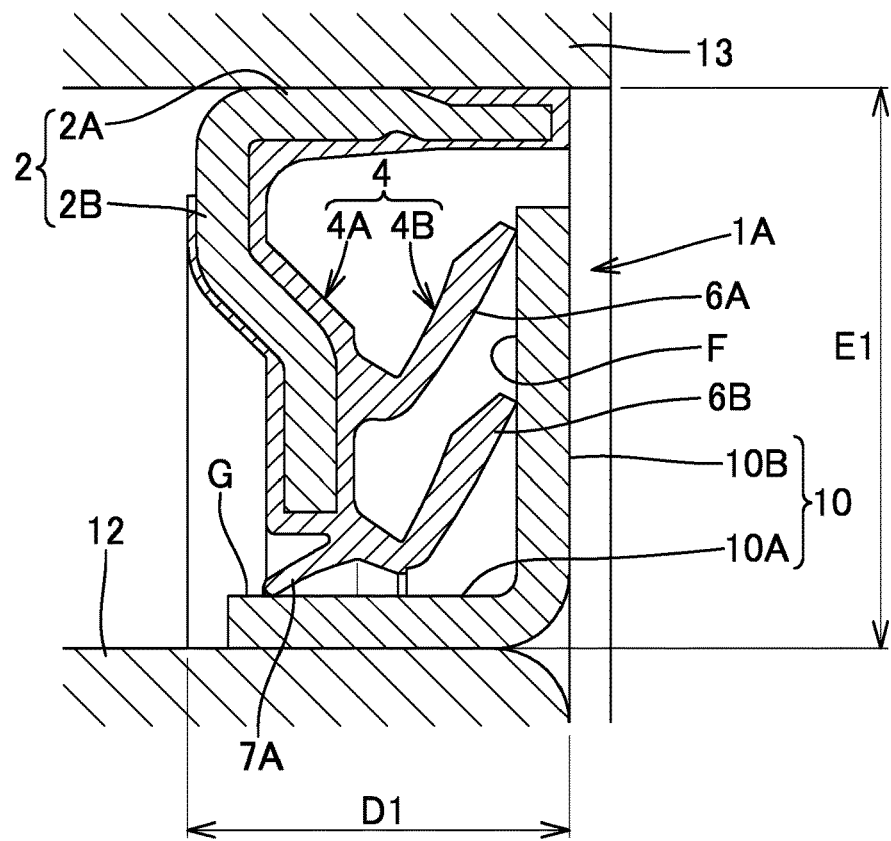
FIG. 2 is a vertical sectional view showing an enlarged major part around an inboard-side rotary seal.
Figure 3:
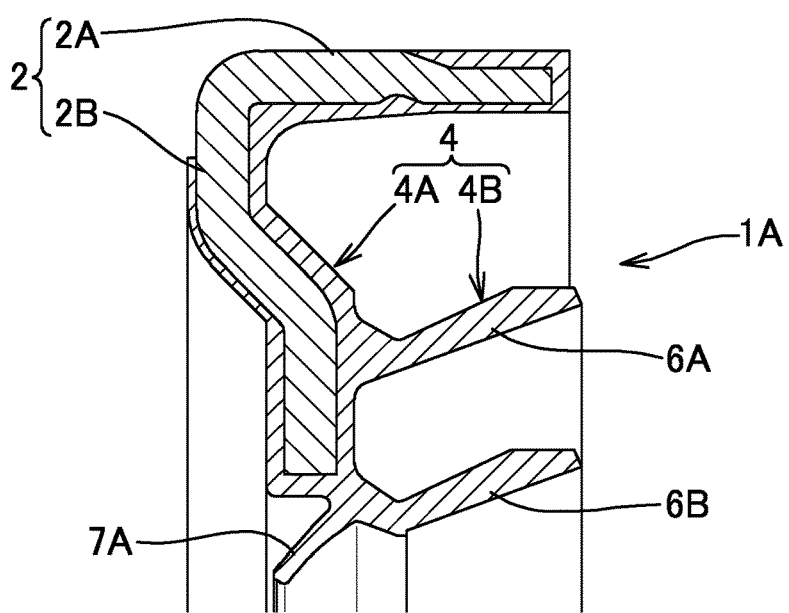
FIG. 3 is a vertical sectional view showing an enlarged major part of the inboard-side rotary seal alone.

As shown in the vertical sectional views in FIG. 2 and FIG. 3, the rotary seal 1A on the inboard side according to the embodiment of the present invention includes: a core metal 2 including a core metal cylinder 2A having a cylindrical shape, and a core metal flange 2B extending inward in the radial direction from one end (outward side end) in the axial direction of the core metal cylinder 2A; and a seal member 4 including a base portion 4A joined to the core metal 2, and a seal lip portion 4B.

The rotary seal 1A further includes a slinger 10 including a cylindrical sleeve 10A and a flange 10B extending outward in the radial direction from one end (inboard-side end) in the axial direction of the sleeve 10A.

The core metal 2 and the slinger 10 are made of metal, and the seal member 4 is made of an elastic material such as rubber.

In the rotary seal 1A, the core metal cylinder 2A is mounted to the outer ring 13 which is a radially outer member, and the sleeve 10A is mounted to the inner ring 12 which is a radially inner member.

The seal lip portion 4B of the seal member 4 includes: two side lips 6A and 6B respectively on the outer diameter side and the inner diameter side, which protrude in a diameter-increasing manner from the base portion 4A toward the inboard side; and a radial lip 7A protruding from the base portion 4A inward in the radial direction.

The distal ends of the side lips 6A and 6B come into slidable contact with a radial-direction surface F of the flange 10B of the slinger 10, and the distal end of the radial lip 7A comes into slidable contact with an outer circumferential surface G of the sleeve 10A of the slinger 10.

The maximum interferences of the side lips 6A, 6B are set to 1.0 mm or less.

In the rotary seal 1A shown in the vertical sectional view of FIG. 2, a thickness (length in the axial direction) D1 of the seal is set in a range of 3.5 mm≤D1≤7 mm, and a width (length in the radial direction) E1 of the seal is set in a range of 5 mm≤E1≤9 mm.

In the case where an encoder is connected to the flange 10B of the slinger 10, the thickness (length in the axial direction) D of the seal includes the thickness of the encoder.

(Rotary Seal on Outboard Side)

Figure 4:
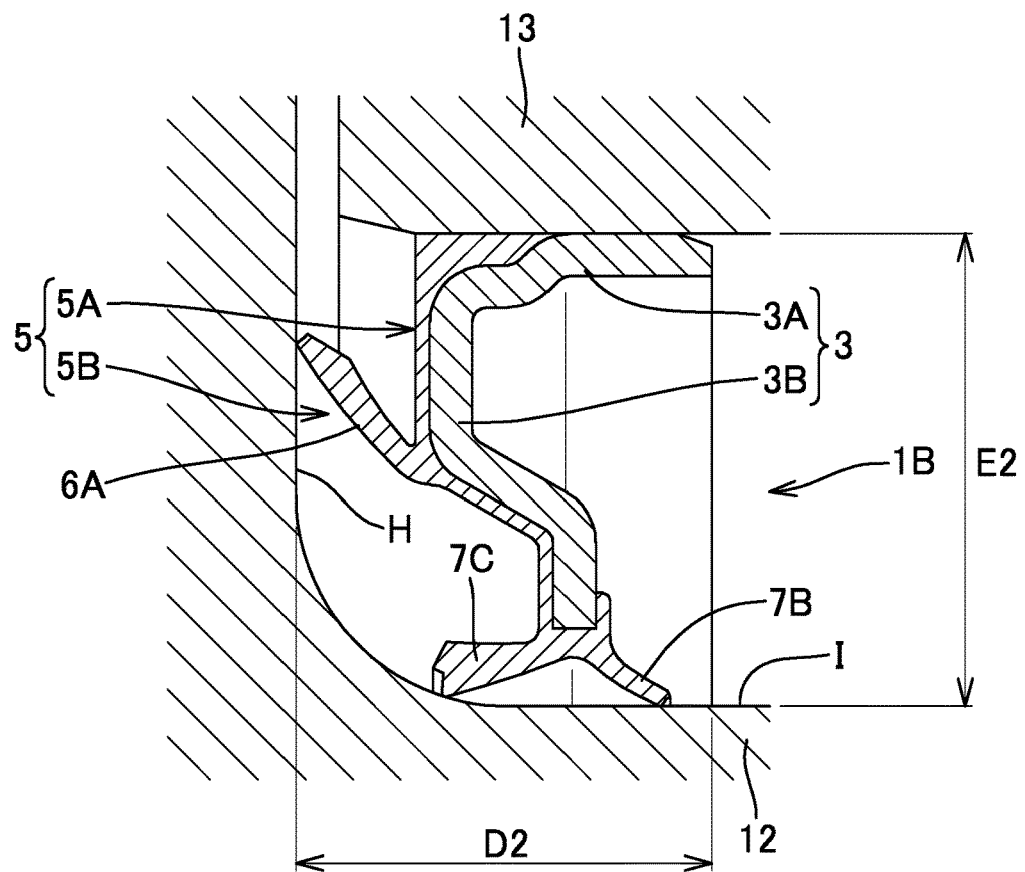
FIG. 4 is a vertical sectional view showing an enlarged major part around an outboard-side rotary seal.
Figure 5:
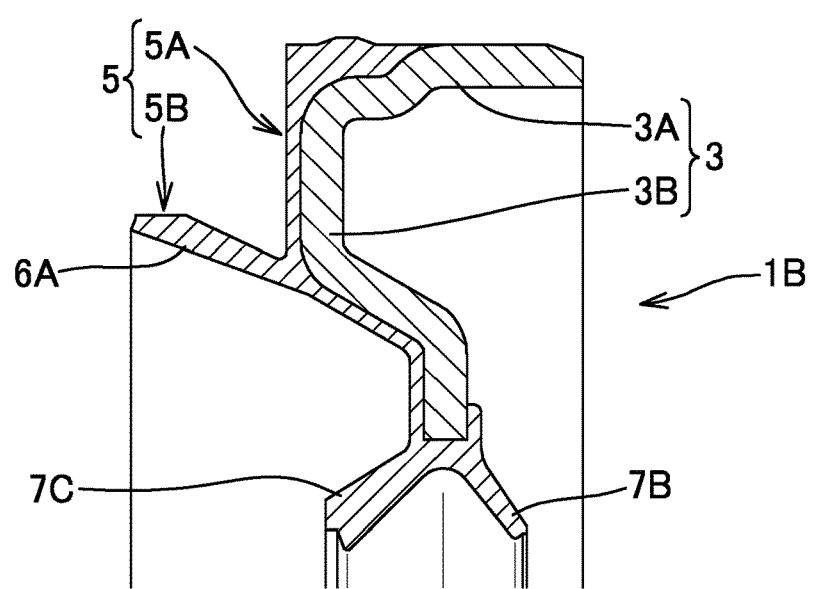
FIG. 5 is a vertical sectional view showing an enlarged major part of the outboard-side rotary seal alone.

As shown in the vertical sectional views in FIG. 4 and FIG. 5, the rotary seal 1B on the outboard side, according to the embodiment of the present invention includes: a core metal 3 including a core metal cylinder 3A having a cylindrical shape, and a core metal flange 3B extending inward in the radial direction from one end (outboard-side end) in the axial direction of the core metal cylinder 3A; and a seal member 5 including a base portion 5A joined to the core metal 3, and a seal lip portion 5B.

The core metal 3 is made of metal, and the seal member 5 is made of an elastic material such as rubber.

The core metal cylinder 3A of the rotary seal 1B is mounted to the outer ring 13 which is a radially outer member.

The seal lip portion 5B of the seal member 5 includes: a side lip 6A protruding in a diameter-increasing manner from the base portion 5A toward the outboard side; and radial lips 7B and 7C protruding from the base portion 5A inward in the radial direction.

The distal end of the side lip 6A comes into slidable contact with a radial-direction surface H of the inner ring 12 which is the radially inner member, and the distal ends of the radial lips 7B, 7C come into slidable contact with an outer circumferential surface I of the inner ring 12.

The maximum interference of the side lip 6A is set to 1.0 mm or less.

In the rotary seal 1B shown in the vertical sectional view of FIG. 4, a thickness (length in the axial direction) D2 of the seal is set in a range of 5 mm≤D2≤10 mm, and a width (length in the radial direction) E2 of the seal is set in a range of 5 mm≤E2≤9 mm.

(Modification of Rotary Seal on Inboard Side)

Figure 6:
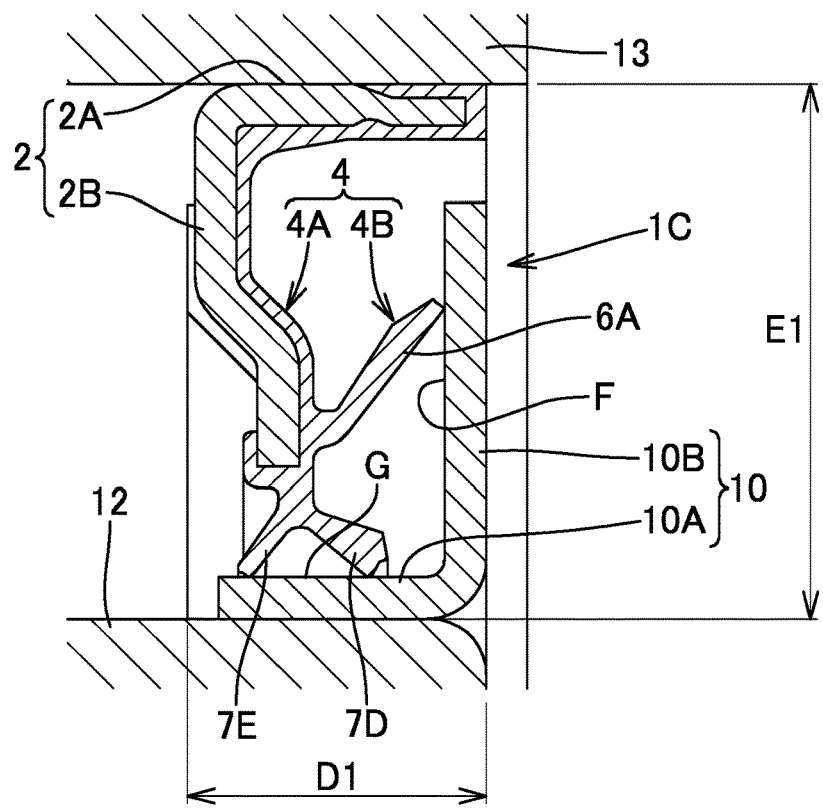
FIG. 6 is a vertical sectional view showing an enlarged major part around an inboard-side rotary seal having a single side lip.
Figure 7:
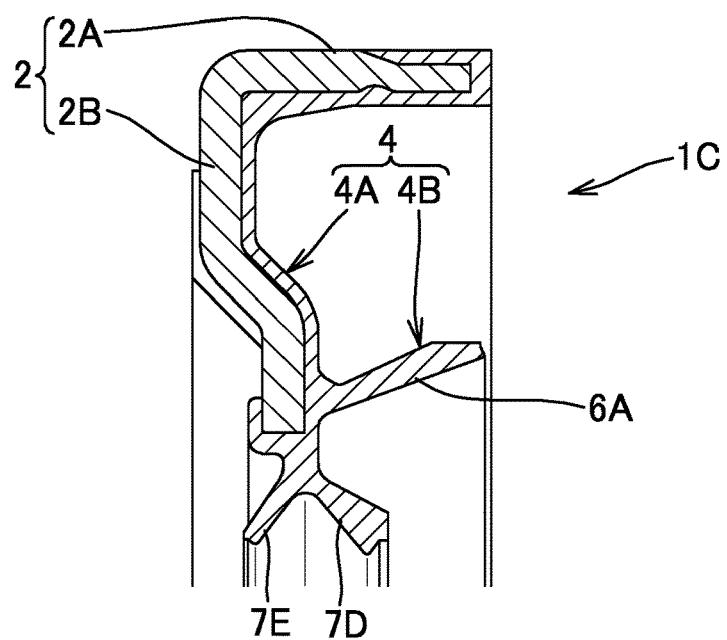
FIG. 7 is a vertical sectional view showing an enlarged major part of the inboard-side rotary seal having the single side lip, alone.

Instead of the rotary seal 1A on the inboard side, a rotary seal 1C shown in the vertical sectional views in FIG. 6 and FIG. 7 may be used.

In the rotary seal 1C, the same reference characters as in the rotary seal 1A shown in FIG. 2 and FIG. 3 indicate the same or corresponding parts or components.

The rotary seal 1C includes a single side lip 6A, instead of two side lips 6A, 6B as in the rotary seal 1A.

The seal lip portion 4B of the seal member 4 includes: the side lip 6A protruding in a diameter-increasing manner from the base portion 4A toward the inboard side; and radial lips 7D and 7E protruding inward from the base portion 4A in the radial direction.

The distal end of the side lip 6A comes into slidable contact with the radial-direction surface F of the flange 10B of the slinger 10, and the distal ends of the radial lips 7D, 7E come into slidable contact with the outer circumferential surface G of the sleeve 10A of the slinger 10.

The maximum interference of the side lip 6A is set to 1.0 mm or less.

In the rotary seal 1C shown in the vertical sectional view in FIG. 6, a thickness (length in the axial direction) D1 of the seal is set in a range of 3.5 mm≤D1≤7 mm, and a width (length in the radial direction) E1 of the seal is set in a range of 5 mm≤E1≤9 mm.

In the case where an encoder is connected to the flange 10B of the slinger 10, the thickness (length in the axial direction) D1 of the seal includes the thickness of the encoder.

<Shape of Side Lip>

Figure 8:
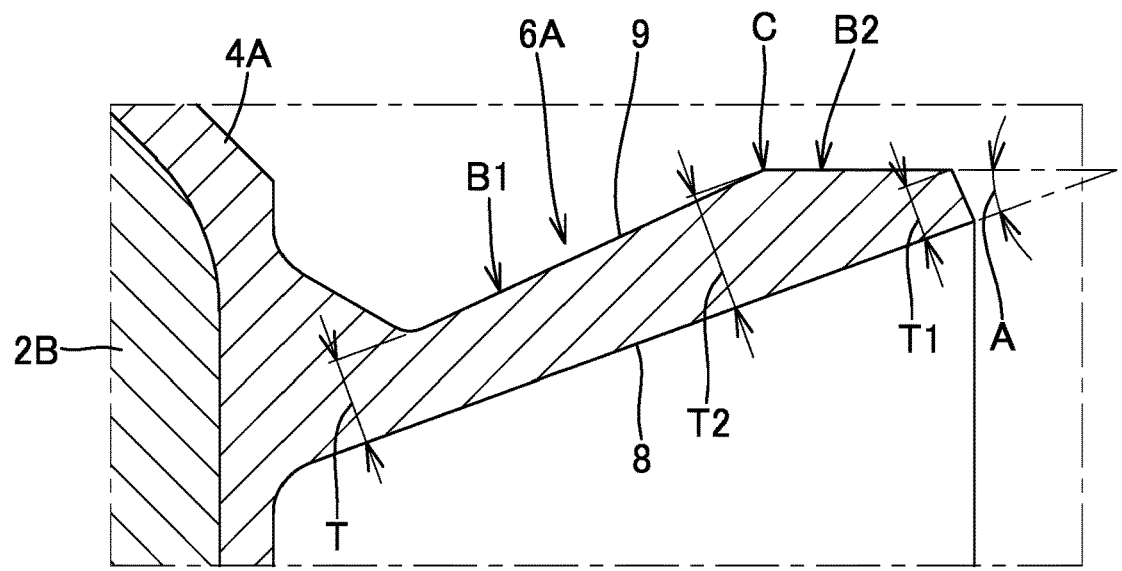
FIG. 8 is a sectional view showing an enlarged major part of dimensions of a side lip.

In the present invention, the side lips 6A, 6B have the same shape, and therefore, the side lip 6A is described as a representative, using dimensions shown in the sectional view in FIG. 8.

In the side lip 6A, the shapes of an inner circumferential side surface 8 and an outer circumferential side surface 9 which determine the thickness of the side lip 6A are as follows. Specifically, the inner circumferential side surface 8 has a shape of the side surface of a cone, and the outer circumferential side surface 9 includes a first outer circumferential portion B1 having a shape of the side surface shape a cone in which the thickness gradually increases from the small diameter side toward the large diameter side, and a second outer circumferential portion B2 having a shape of the side surface of a cone or a column in which the thickness gradually decreases.

Thus, the side lip 6A has an intermediate thick shape in which an intermediate thick portion C at the boundary between the first outer circumferential portion B1 and the second outer circumferential portion B2 is thickest.

The numerical ranges for defining the shape of the side lip 6A (6B) are determined as described below, and the numerical range of the thickness T1 at the distal end portion of the side lip 6A (6B), the numerical range of the thickness T2 at the intermediate thick portion C of the side lip 6A (6B), and the numerical range of the angle A of the distal end portion formed by the generating line of the cone of the inner circumferential side surface 8 and the generating line of the cone or the column of the second outer circumferential portion B2 in the side lip 6A (6B), are as follows.

Specifically, the thickness T1 of the distal end portion is 0.5 T to 0.7 T relative to the thickness T of the base end portion, the thickness T2 of the intermediate thick portion C is 1.2 T to 1.5 T relative to the thickness T of the base end portion, and the angle A of the distal end portion is 10° to 30°.

<Relationship Between Interference and Reaction Force>

In Examples 1 to 5 and Comparative example regarding the shape of the side lip 6A shown in dimensions (normalized by defining the thickness T of the base end portion of the side lip 6A as 1) in Table 1, the relationships between the interference and the reaction force when the amount of wear was zero were obtained using structure analysis software, MARC (registered trademark).

TABLE 1

| Dimensions | Example 1 | Example 2 | Example 3 | Example 4 | Example 5 | Comparative example |
|---|---|---|---|---|---|---|
| Thickness T of base end portion | 1 | 1 | 1 | 1 | 1 | 1 |

TABLE 1-continued

| Dimensions | Example 1 | Example 2 | Example 3 | Example 4 | Example 5 | Comparative example |
|---|---|---|---|---|---|---|
| Thickness T1 of distal end portion | 0.62 | 0.71 | 0.71 | 0.50 | 0.50 | 0.62 |
| Thickness T2 of intermediate thick portion | 1.32 | 1.50 | 1.50 | 1.21 | 1.21 | 1.41 |
| Angle A (°) of distal end portion | 20 | 30 | 25 | 15 | 10 | 40 |

Figure 9:
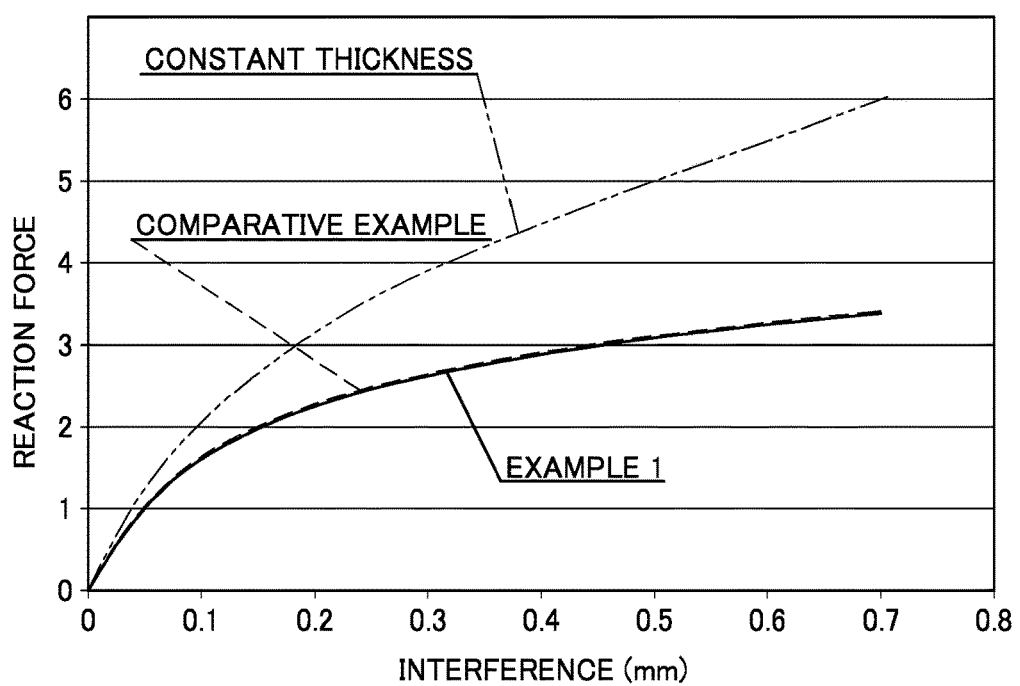
FIG. 9 is a graph showing the relationships between an interference and a reaction force in Example 1 and Comparative example.

FIG. 9 is a graph showing the relationships between the interference and the reaction force in Example 1 and Comparative example, and Example 1 and Comparative example indicate the same result. Regarding Examples 2 to 5 in which the relationships were obtained in the same manner, the reaction forces in Examples 2 and 3 are greater by about 2% than that in Comparative example, the reaction force in Example 4 is smaller by about 1% than that in Comparative example, and the reaction force in Example 5 is smaller by about 2% than that in Comparative example.

As described above, the relationship between the interference and the reaction force is almost the same between Example 1 to 5 and Comparative example, and therefore it is possible to compare the surface pressure using the contact surface (slidable-contact area) of the lip.

In the graph in FIG. 9, an example of the relationship between the interference and the reaction force in a side lip having a constant thickness, is also shown by a two-dot dashed line.

As is found from the graph in FIG. 9, in the side lip having the intermediate thick shape as in Examples 1 to 5 and Comparative example, even when the interference is reduced due to wear of the lip, the amount of reduction in the reaction force is small as compared to the side lip having a constant thickness. Thus, the influence on reduction in the surface pressure due to reduction in the reaction force can be decreased.

In addition, the interference can vary within a certain range depending on the workmanship of the bearing or the seal. However, in the case of the side lip having the intermediate thick shape, the reaction force does not greatly vary depending on the workmanship of the bearing or the seal. In the case where the interference has varied to increase, the amount of increase in torque is small, and in the case where the interference has varied to decrease, the influence on reduction in the surface pressure is small.

Further, in the case of the side lip having the intermediate thick shape, the torque is low as a whole, as compared to the side lip having a constant thickness.

<Comparison in Contact Area after Wearing of Lip>

Regarding each of Examples 1 to 5 and Comparative example, an analysis model reproducing the contact state after the side lip is worn, and the contact area with the radial-direction surface F of the flange 10B of the slinger 10 was calculated for each wear amount. With the material of the seal member 4 being set to nitrile rubber (NBR) and the interference being set to 0.7 mm, analysis was performed using structure analysis software MARC (registered trademark).

Figure 10:
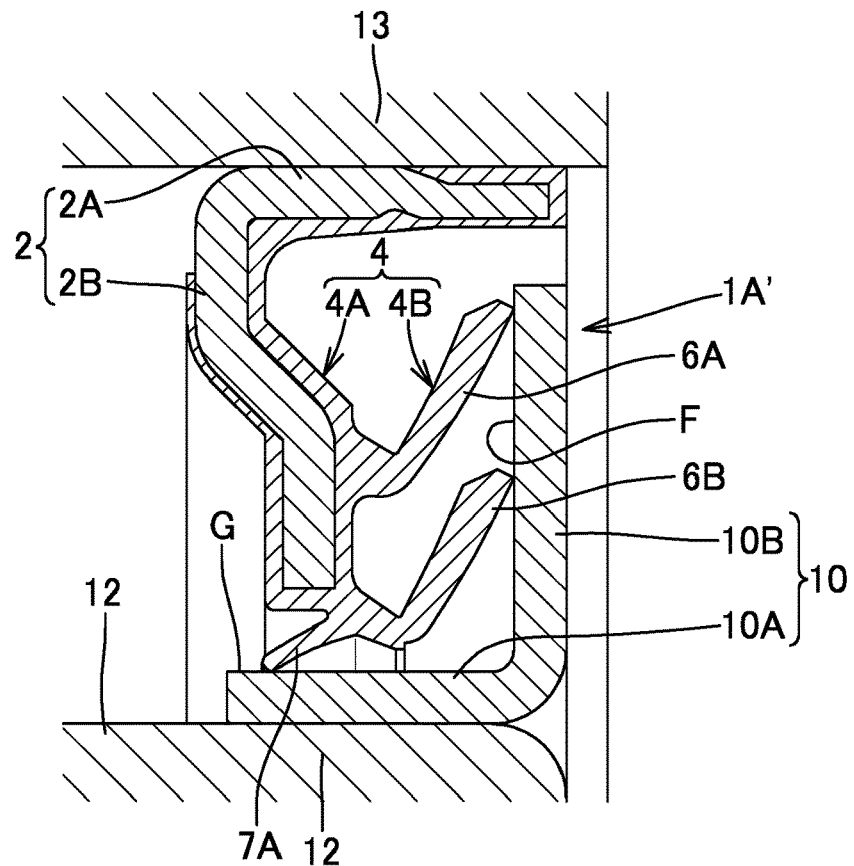
FIG. 10 is a vertical sectional view showing an enlarged major part around an inboard-side rotary seal in Comparative example.
Figure 11:
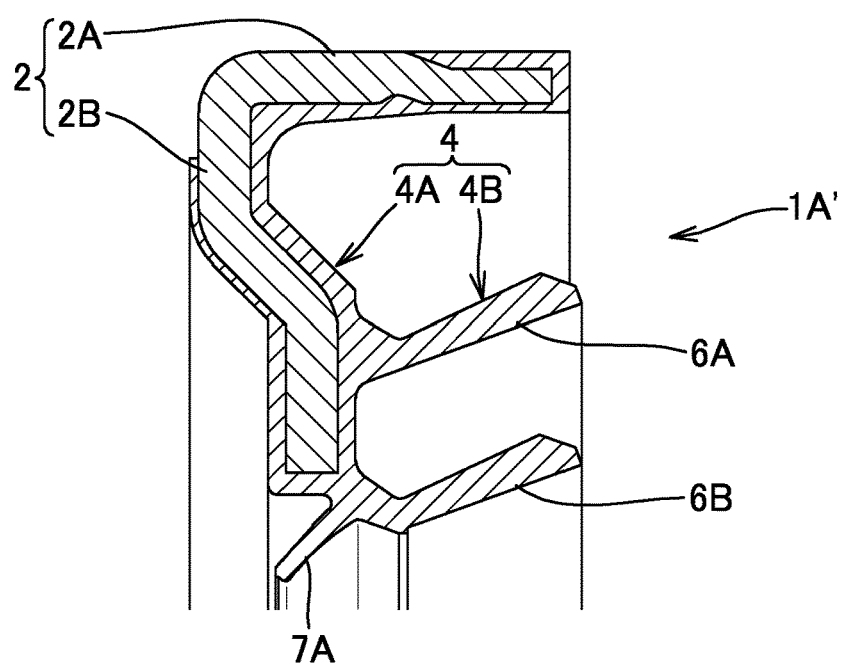
FIG. 11 is a vertical sectional view showing an enlarged major part of the inboard-side rotary seal in Comparative example, alone.
Figure 12A:
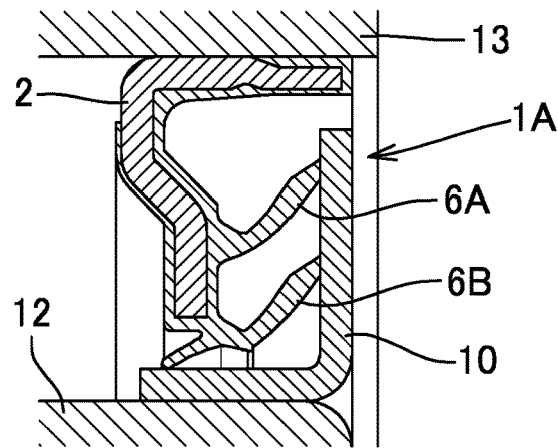
FIG. 12A is a sectional view of an enlarged major part of the rotary seal in a state where a rotary seal in Example 1 is worn by 0.2 mm.
Figure 12B:
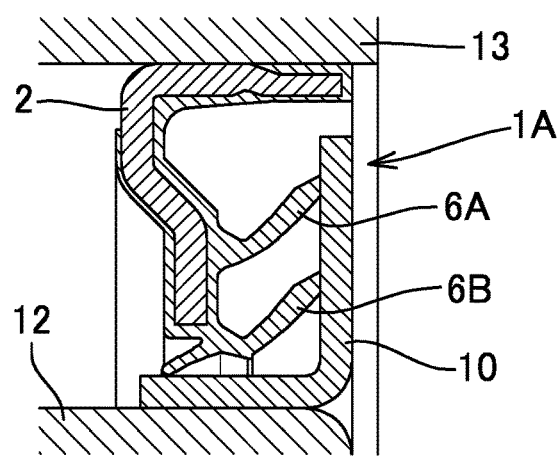
FIG. 12B is a sectional view of an enlarged major part of the rotary seal in a state where the rotary seal is worn by 0.3 mm.
Figure 12C:
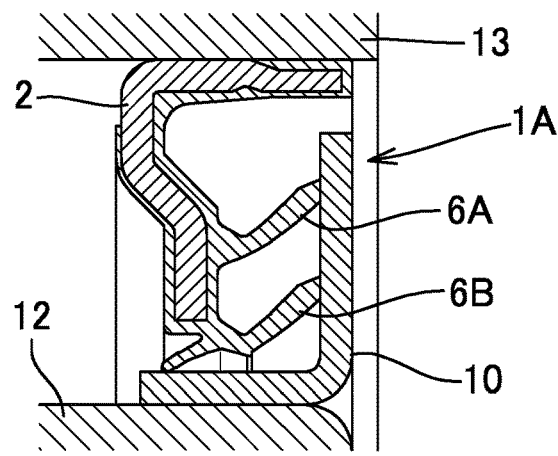
FIG. 12C is a sectional view of an enlarged major part of the rotary seal in a state where the rotary seal is worn by 0.4 mm.
Figure 12D:
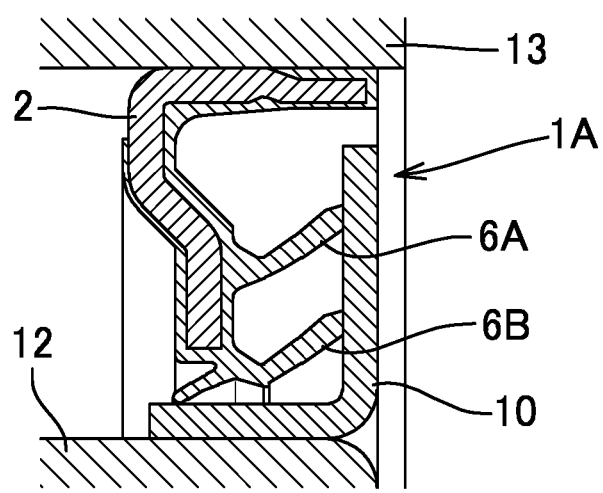
FIG. 12D is a sectional view of an enlarged major part of the rotary seal in a state where the rotary seal is worn by 0.5 mm.
Figure 12E:
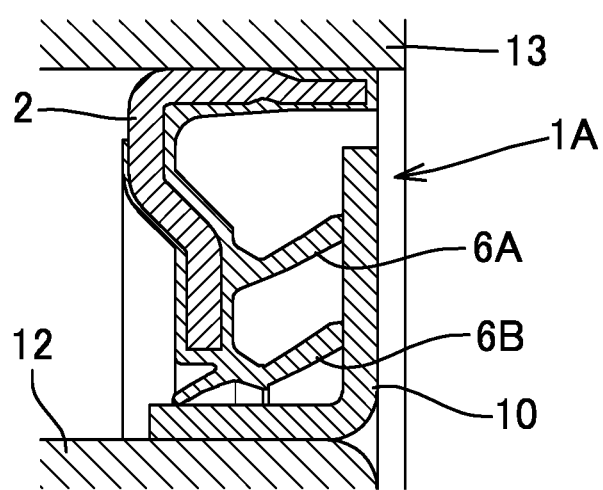
FIG. 12E is a sectional view of an enlarged major part of the rotary seal in a state where the rotary seal is worn by 0.6 mm.

The shape of the rotary seal 1A shown in the vertical sectional views of FIG. 2 and FIG. 3 corresponds to the case where the amount of wear is zero in Example 1, and the shape of a rotary seal 1A' shown in the vertical sectional views of FIG. 10 and FIG. 11 corresponds to the case where the amount of wear is zero in Comparative example.

The sectional views of FIG. 12A to FIG. 12E show the analysis models reproducing the contact state after wearing in Example 1, and show states in which the side lips 6A, 6B were worn by 0.2 mm, 0.3 mm, 0.4 mm, 0.5 mm, and 0.6 mm, respectively.

Figure 13:
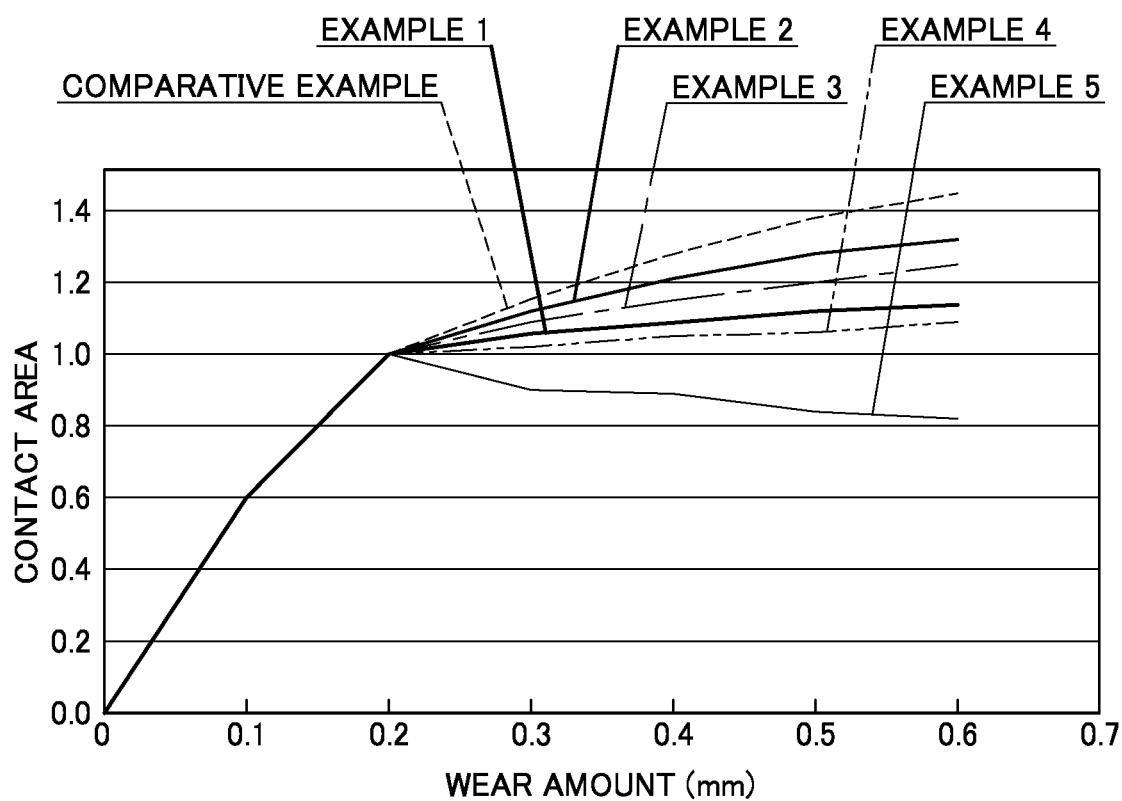
FIG. 13 is a graph showing the relationships between a lip wear amount and a contact area in Examples 1 to 5 and Comparative example.

Table 2 and FIG. 13 show the relationship between the amount of wear of the side lip and the contact area (normalized by defining, as 1, the contact area when the amount of wear is 0.2 mm) in Examples 1 to 5 and Comparative example.

TABLE 2

| | Contact area | | | | | |
|---|---|---|---|---|---|---|
| Wear amount (mm) | Example 1 | Example 2 | Example 3 | Example 4 | Example 5 | Comparative example |
| 0.2 | 1 | 1 | 1 | 1 | 1 | 1 |
| 0.3 | 1.06 | 1.12 | 1.09 | 1.02 | 0.90 | 1.15 |
| 0.4 | 1.09 | 1.21 | 1.15 | 1.05 | 0.89 | 1.27 |
| 0.5 | 1.12 | 1.28 | 1.20 | 1.06 | 0.84 | 1.38 |
| 0.6 | 1.14 | 1.32 | 1.25 | 1.09 | 0.82 | 1.44 |

From Table 2 and FIG. 13, it is found that, in Comparative example, the rate of increase in the contact area due to increase in the amount of wear is great as compared to Examples 1 to 5.

Therefore, in Comparative example, it is conceivable that the contact area of the lip distal end portion increases due to wear, and thus the surface pressure is reduced, so that the sealing property cannot be ensured.

In contrast, in Examples 1 to 5, the rate of increase in the contact area of the lip distal end portion due to wear is small as compared to Comparative example, and therefore the surface pressure is less likely to be reduced, and thus the sealing property can be easily ensured.

In the rotary seals 1A, 1B, 1C according to the embodiment of the present invention, the maximum interference of the side lip is 1.0 mm or less, as described above. In such rotary seals, the minimum interference is 0.1 mm.

Therefore, in Examples 1 to 5 and Comparative example in which the interference is 0.7 mm, the maximum wear amount is 0.6 mm which corresponds to the amount of wear when the effective minimum interference of 0.1 mm is reached.

The rate of increase in the contact area of the lip distal end portion when wear has progressed until the effective minimum interference is reached (the amount of wear=0.6 mm), is 44% in Comparative example, 14% in Example 1, 32% in Example 2, 25% in Example 3, 9% in Example 4, and −18% in Example 5, relative to the contact area of the lip distal end portion when the amount of wear is 0.2 mm.

Therefore, the rate of increase in the contact area of the lip distal end portion when wear has progressed until the effective minimum interference is reached, is preferably 32% or less in light of Example 2, and more preferably 25% or less in light of Example 3, relative to the contact area of the lip distal end portion when the amount of wear is 0.2 mm.

<Considerations of Numerical Ranges>

(Upper Limit Value of Thickness T1 of Distal End Portion of Side Lip)

From the dimensions in Examples 2 and 3 in Table 1, the thickness T1 of the distal end portion of the side lip is set to 0.7 T or less, relative to the thickness T of the base end portion of the side lip.

(Lower Limit Value of Thickness T1 of Distal End Portion of Side Lip)

From the dimensions in Examples 4 and 5 in Table 1, the thickness T1 of the distal end portion of the side lip is set to 0.5 T or greater, relative to the thickness T of the base end portion of the side lip.

(Upper Limit Value of Thickness T2 of Intermediate Thick Portion of Side Lip)

From the dimensions in Examples 2 and 3 in Table 1, the thickness T2 of the intermediate thick portion C of the side lip is set to 1.5 T or less, relative to the thickness T of the base end portion of the side lip.

(Lower Limit Value of Thickness T2 of Intermediate Thick Portion of Side Lip)

From the dimensions in Examples 4 and 5 in Table 1, the thickness T2 of the intermediate thick portion C of the side lip is set to 1.2 T or greater, relative to the thickness T of the base end portion of the side lip.

(Upper Limit Value of Angle A of Distal End Portion of Side Lip)

From the dimensions in Example 2 in Table 1, the angle A of the distal end portion of the side lip is set to 30° or less.

(Lower Limit Value of Angle A of Distal End Portion of Side Lip)

From the dimensions in Example 5 in Table 1, the angle A of the distal end portion of the side lip is set to 10° or greater.

With the numerical ranges as described above, in the case where the contact area when the amount of wear is 0.2 mm is defined as 1 and the wear further progresses, change in the contact area after the wearing is small (for example, even when the amount of wear is 0.6 mm in Example 2, the contact area is 1.32), and the initially set surface pressure is not greatly reduced even after the wearing. Thus, the sealing property can be ensured even after the wearing.

As shown in Table 2 and FIG. 13, the rate of increase in the contact area of the lip distal end portion due to wear is smaller in Example 3 (A=25°) than in Example 2 (A=30°). Therefore, the angle A of the distal end portion of the side lip is more preferably 25° or less.

In Example 5, since the angle A is 10°, the position of the intermediate thick portion C is close to the base end portion of the side lip. Thus, in Example 5 (A=10°), the contact area is reduced after the wearing, as is found from Table 2 and FIG. 13. Therefore, the initially set surface pressure increases after the wearing.

In Example 5 (A=10°), the object of preventing reduction in the surface pressure even after the wearing can be achieved, but it is desirable that change in the surface pressure is small.

In Example 4 (A=15°), change in the contact area after wearing is small, as is found from Table 2 and FIG. 13. Therefore, the angle A of the distal end portion of the side lip is more preferably 15° or greater.

The description of the above embodiment is in all aspects illustrative and not restrictive. Various improvements and modifications can be made without departing from the scope of the present invention.

What is claimed is:

1. A rotary seal comprising:
a core metal including a core metal cylinder having a cylindrical shape, and a core metal flange extending inward in a radial direction from one end of the core metal cylinder in an axial direction; and
a seal member including a base portion joined to the core metal, and a seal lip portion, wherein
the seal lip portion includes a side lip protruding in a diameter-increasing manner from the base portion,
the side lip has an inner circumferential side surface and an outer circumferential side surface, and shapes of the inner circumferential side surface and the outer circumferential side surface that determine a thickness of the side lip are formed such that
the inner circumferential side surface has a side surface shape of a cone, and
the outer circumferential side surface includes a first outer circumferential portion having a side surface shape of a cone in which the thickness gradually increases from a small diameter side toward a large diameter side, and a second outer circumferential portion having a side surface shape of a cone or a column in which the thickness gradually decreases, so as to form an intermediate thick shape in which an intermediate thick portion at a boundary between the first outer circumferential portion and the second outer circumferential portion is thickest,
a thickness of a distal end portion of the side lip is 0.5 T to 0.7 T, and a thickness of the intermediate thick portion is 1.2 T to 1.5 T, relative to a thickness T of a base end portion of the side lip, and
an angle formed by a generating line of the cone of the inner circumferential side surface and a generating line of the cone or the column of the second outer circumferential portion is 10° to 30°.

2. The rotary seal according to claim 1, wherein the angle formed by the generating line of the cone of the inner circumferential side surface and the generating line of the cone or the column of the second outer circumferential portion is 15° to 25°.

* * * * *